(12) United States Patent
Rousseau

(10) Patent No.: US 10,464,531 B2
(45) Date of Patent: Nov. 5, 2019

(54) DEVICE FOR ACTUATING A DRIVING ARM OF A WIPER, IN PARTICULAR FOR THE REAR WINDOW OF A VEHICLE, AND WIPING SYSTEM EQUIPPED WITH SUCH A DEVICE

(71) Applicant: Valeo Systèmes d'Essuyage, Le Mesnil Saint Denis (FR)

(72) Inventor: Jean-François Rousseau, Charbonnier les Mines (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 451 days.

(21) Appl. No.: 14/430,921

(22) PCT Filed: Sep. 26, 2013

(86) PCT No.: PCT/EP2013/070139
§ 371 (c)(1),
(2) Date: Mar. 25, 2015

(87) PCT Pub. No.: WO2014/049096
PCT Pub. Date: Apr. 3, 2014

(65) Prior Publication Data
US 2015/0239432 A1     Aug. 27, 2015

(30) Foreign Application Priority Data
Sep. 27, 2012  (FR) ..................... 12 59088

(51) Int. Cl.
*B60S 1/34*  (2006.01)
*B60S 1/52*  (2006.01)
*B60S 1/38*  (2006.01)

(52) U.S. Cl.
CPC ............ *B60S 1/345* (2013.01); *B60S 1/524* (2013.01); *B60S 1/3415* (2013.01); *B60S 1/3436* (2013.01); *B60S 2001/3825* (2013.01)

(58) Field of Classification Search
CPC .... B60S 1/3436; B60S 1/3475; B60S 1/3415; B60S 1/522; B60S 1/524; B60S 1/345; B60S 1/36; B60S 2001/3825
(Continued)

(56) References Cited

U.S. PATENT DOCUMENTS 1,573,618 A * 2/1926 Laganke ................ B60S 1/14
15/245
1,613,319 A * 1/1927 Fuchs ................... A47L 1/02
15/250.002
(Continued)

FOREIGN PATENT DOCUMENTS

DE  10 2010 049 742 A1  5/2012
EP       1 914 130 A1  4/2008
(Continued)

OTHER PUBLICATIONS

International Search Report issued in PCT/EP2013/070139 dated Nov. 5, 2013 (6 pages).
(Continued)

*Primary Examiner* — Gary K. Graham
(74) *Attorney, Agent, or Firm* — Osha Liang LLP

(57) ABSTRACT

The invention relates to an actuation device for a driving arm (2) of a wiper (3), in particular for a motor vehicle, said device comprising: a body (10) hinged to rotate about a pivot axis and capable of receiving the arm (2), and a means (14) for locking the arm (2) on the body (10), said locking means (14) being hinged with the body (10). The invention also relates to a system for wiping a window of a vehicle, comprising said device.

18 Claims, 3 Drawing Sheets

Figure 1:
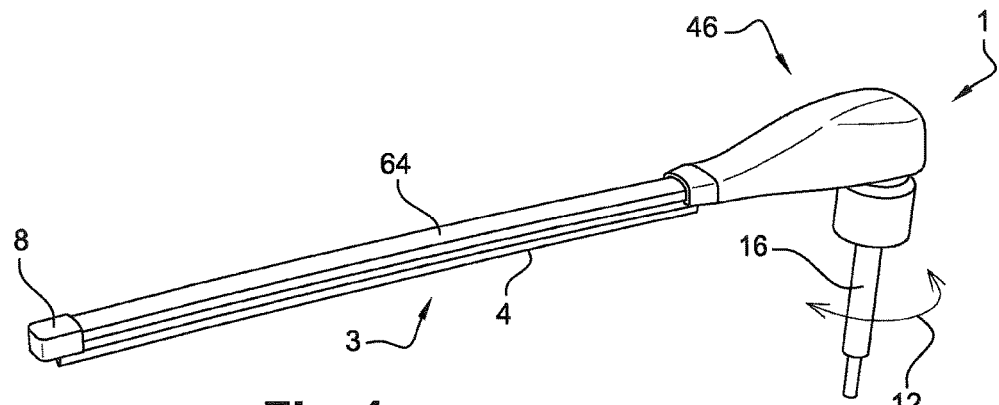

(58) Field of Classification Search
USPC .......... 15/250.351, 250.352, 250.04, 250.34
See application file for complete search history.

(56) References Cited

U.S. PATENT DOCUMENTS

| | | | | |
|---|---|---|---|---|
| 2,528,979 | A * | 11/1950 | Smulski | B60S 1/36 15/250.202 |
| 2,691,790 | A * | 10/1954 | O'Shei | B60S 1/34 15/250.351 |
| 2,715,239 | A * | 8/1955 | Mintz | B60S 1/32 15/250.202 |
| 2,918,690 | A * | 12/1959 | Krohm | B60S 1/36 15/250.02 |
| 3,064,297 | A * | 11/1962 | Krohm | B60S 1/34 15/250.202 |
| 3,480,986 | A * | 12/1969 | Forster | B60S 1/32 15/250.32 |
| 3,790,083 | A * | 2/1974 | Redifer | B05B 1/10 15/250.04 |
| 3,939,525 | A * | 2/1976 | Stratton | B60S 1/36 15/250.351 |
| 4,251,899 | A * | 2/1981 | Hoyler | B60S 1/36 15/250.351 |
| 4,791,697 | A * | 12/1988 | Fry | B60S 1/32 15/250.202 |
| 5,566,419 | A * | 10/1996 | Zhou | B60S 1/32 15/250.34 |
| 6,499,179 | B1 * | 12/2002 | Fink | B60S 1/0408 15/250.04 |
| 2002/0144373 | A1 | 10/2002 | Muramatsu | |
| 2008/0209662 | A1 | 9/2008 | Wilms et al. | |
| 2008/0216274 | A1 | 9/2008 | Egner-Walter et al. | |
| 2011/0056041 | A1 | 3/2011 | Wu | |
| 2012/0110773 | A1 | 5/2012 | Thielen et al. | |

FOREIGN PATENT DOCUMENTS

| | | | |
|---|---|---|---|
| FR | 2 236 359 | A5 | 1/1975 |
| GB | 665362 | * | 1/1952 |
| JP | 2002-362326 | A | 12/2002 |
| JP | 2008546596 | A | 12/2008 |
| JP | 2009511335 | A | 3/2009 |
| JP | 2010-12815 | A | 1/2010 |
| WO | 2011/131245 | A1 | 10/2011 |

OTHER PUBLICATIONS

The Second Office Action issued in corresponding Chinese Patent Application No. 201380050831.3, dated Dec. 30, 2016 (18 pages).
Notification of Reason for Rejection issued in corresponding Japanese Patent Application No. 2015-533593, dated May 19, 2017 (5 pages).

* cited by examiner

DEVICE FOR ACTUATING A DRIVING ARM OF A WIPER, IN PARTICULAR FOR THE REAR WINDOW OF A VEHICLE, AND WIPING SYSTEM EQUIPPED WITH SUCH A DEVICE

The technical sector of the present invention is that of wiping systems for a window of a vehicle, in particular a motor vehicle. The system in accordance with the invention is intended more specifically to be installed on a rear window or rear screen of the vehicle.

With regard to the wiping of the windows of a motor vehicle, the emphasis is often placed on wiping of the windscreen. Wiping of the rear window must not be overlooked, however. Its purpose is, in fact, to provide the driver with an unobstructed view of the traffic to the rear of the vehicle or in the event of reversing. Whereas the wiper blades for a windscreen are generally detachable in relation to their driving arm in order to permit the replacement of the blade alone in the event of wear, in the case of a system for a rear window, on the other hand, it is customary to replace an assembly consisting of both the wiper blade and the driving arm. For this purpose, said assembly is made detachable in relation to a hub or a device for actuating the arm. Different solutions have already been proposed to this end, although they present difficulties, in particular in terms of the weight and the dimensions of the solutions equipped therewith.

It is common, furthermore, to permit washing of the rear windows with the help of nozzles for spraying a washing liquid, said nozzles being disposed on the body of the vehicle. Also familiar according to a more recent version are wiping systems permitting spraying to take place directly from the blades. Such a result is achieved by incorporating nozzles for spraying the washing liquid into the blades, said spraying nozzles being supplied from a circuit bringing the washing liquid to the wipers.

This being the case, the connection devices for a wiping system for a rear window are not readily compatible with such systems.

The invention proposes to address the aforementioned disadvantages and proposes to this end an actuation device for a driving arm of a wiper blade, intended in particular for a motor vehicle, said device comprising a body that is hinged to rotate about a pivot axis and is capable of receiving said arm, and a means for locking said arm on said body, said locking means being hinged on said body.

In this way, a solution is available which permits the easy assembly and disassembly of the arm and, as a result, of the blade. This is also a solution which facilitates the use of a device for spraying washing liquid that is integrated into the blade.

According to various embodiments of the invention, which may be considered together or separately:
said locking means is hinged to rotate on said body according to an axis of articulation that is transversal to said pivot axis of the body,
said body is configured to position said arm prior to locking,
said body comprises a flat spot and said locking means comprises a bar, said locking means being configured to be capable of sandwiching said arm between said flat spot and said bar,
said locking means comprises two arms connecting said bar to said axis of articulation,
said body comprises two lateral faces extending from said flat spot configured to receive lateral wings of said arm and to permit blocking of said arm in a tangential direction,
said lateral faces comprise notches configured to accommodate said wings by blocking them in a radial direction,
said locking means are articulated in the area of a distal extremity of said body and are configured to clip onto said body at an opposite extremity,
said body comprises a housing passage for a driving shaft intended to be attached to said body,
said body comprises one or a plurality of attachment holes for a cover,
said locking means comprises a passage for a circuit for the supply of washing liquid.

The invention likewise relates to a wiping system comprising an actuating device as described above.

According to different embodiments of the invention, which may be considered together or separately:
said system comprises a driving arm attached to said actuating device and/or a wiper blade capable of being actuated by said arm,
said arm exhibits a spring effect permitting the application of the wiper against a screen to be wiped,
said system comprises a device for spraying from said wiper,
said spraying device comprises a flexible tube connecting a nozzle provided in the area of said arm and/or of said blade, on the one hand, and, on the other hand, an inlet for spraying liquid, situated in the area of said pivot axis of the actuating device,
said system comprises a cover for said actuating device,
said cover comprises tabs for attachment to said body,
said tabs are capable of being inserted into said attachment holes.

Figure 2:
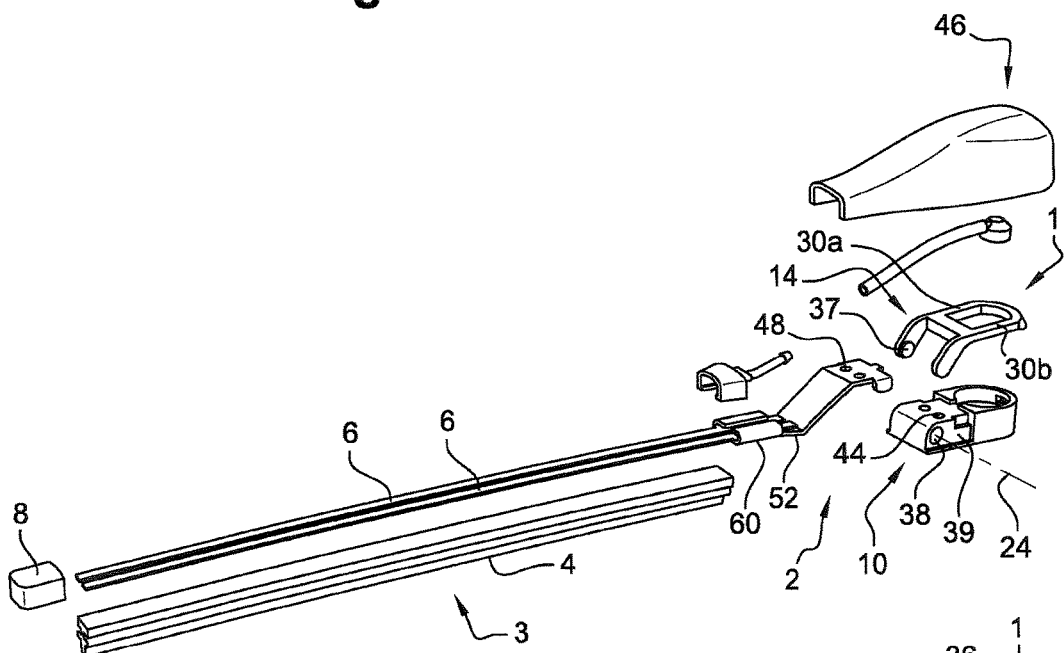
Figure 3:
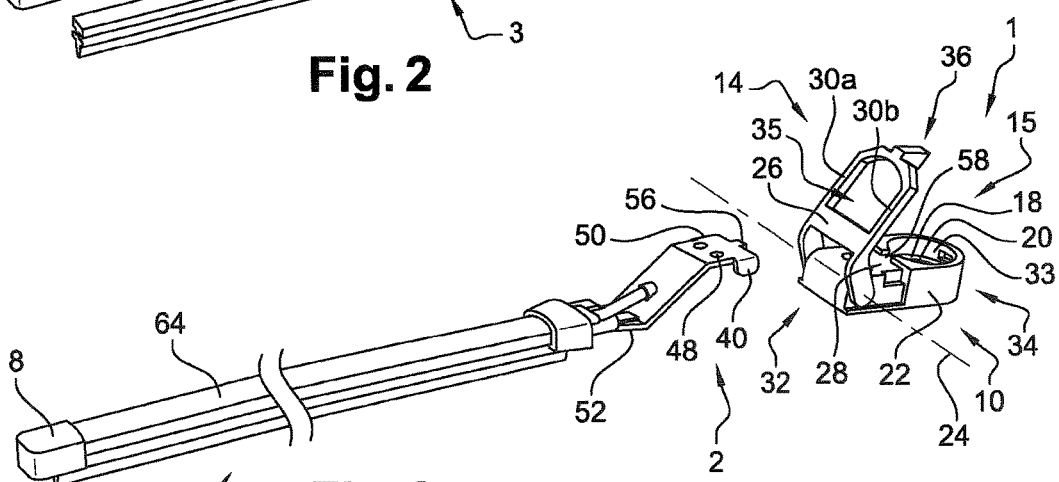
Figure 4:
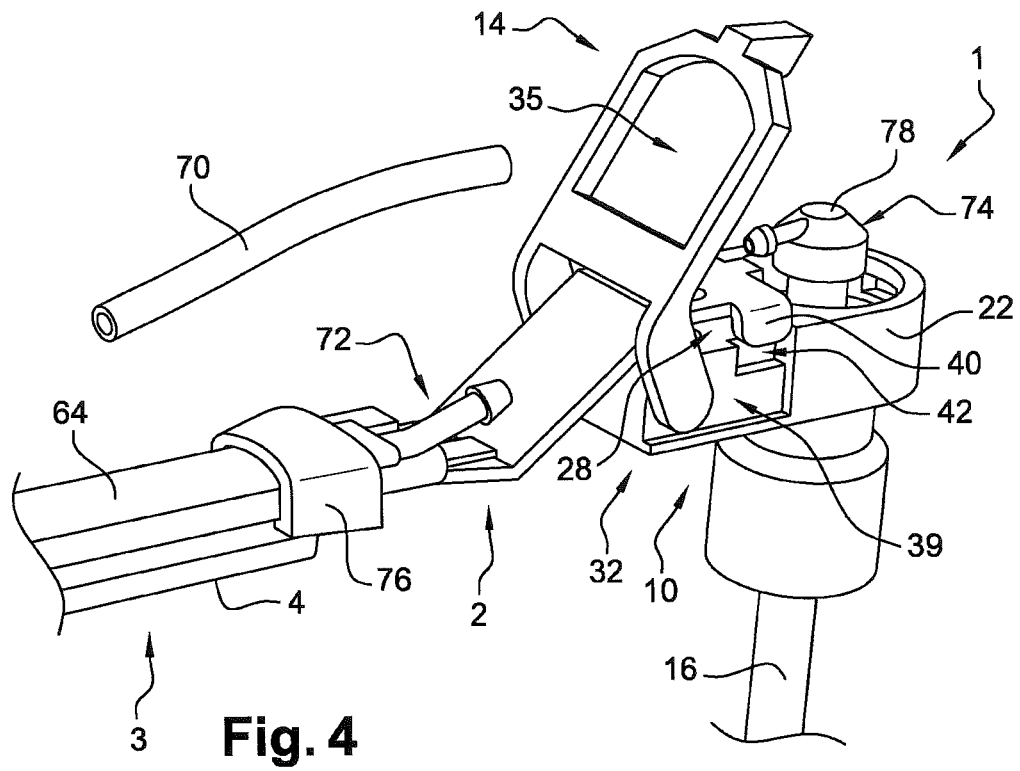
Figure 5:
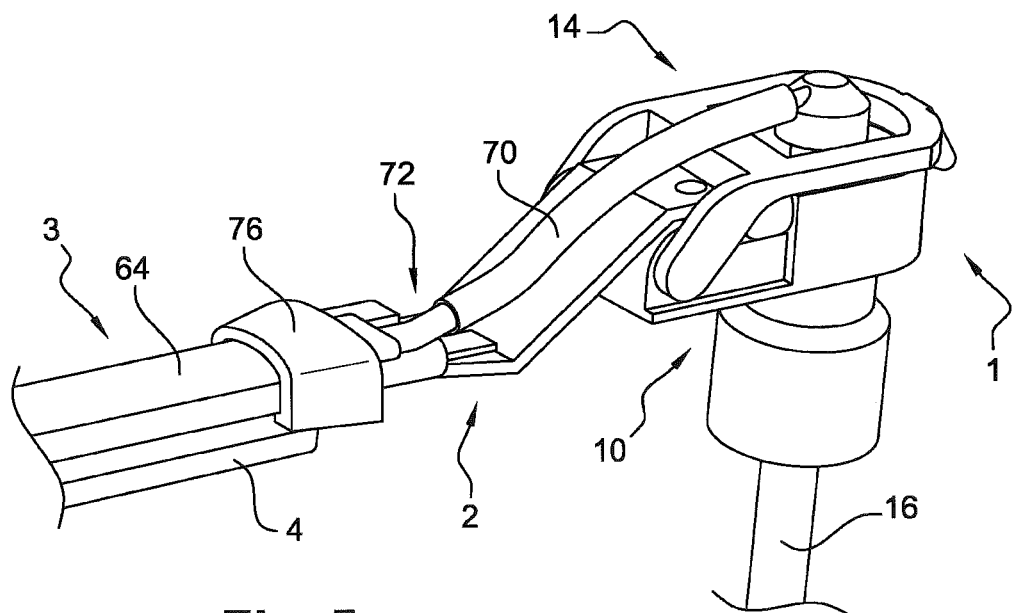
Figure 6:
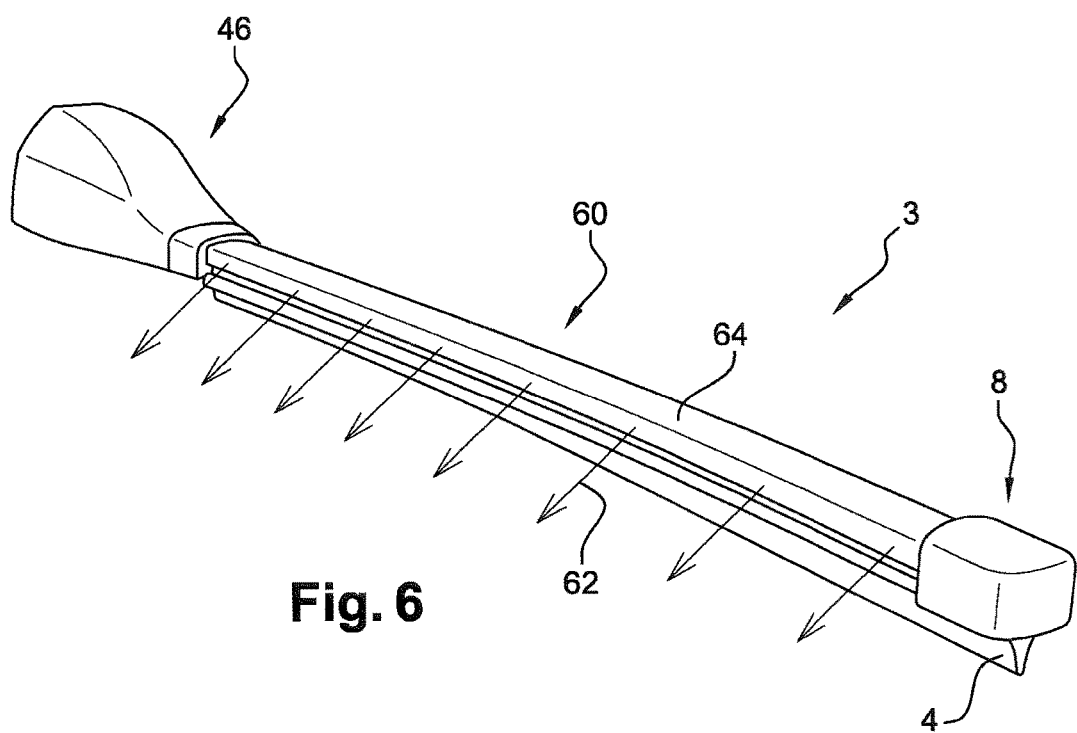

Other characterizing features, details and advantages of the invention will be appreciated more clearly from a perusal of the description provided below for information purposes in relation to the drawings, in which:

FIG. 1 illustrates in perspective an example of a wiping system in accordance with the invention, FIG. 2 is a partially exploded view of FIG. 1, FIG. 3 is a view according to FIG. 2, in which the components of said actuating device, on the one hand, and, on the other hand, the components of the assembly formed by the blade and the arm of said wiping system are depicted in an assembled form, FIG. 4 illustrates in detail a section of FIG. 1, the cover of the wiping system not having been depicted here in order to provide a better view of the locking means for the actuating device of the system, in the open or unlocked position, FIG. 5 repeats FIG. 4, the locking means on this occasion being in the locked position, FIG. 6 repeats, partially, FIG. 1, from a different viewing angle.

As illustrated in FIGS. 1 to 3, the invention relates to a device 1 for actuating a driving arm 2 for a wiper blade 3 for a vehicle screen, in this case a rear window of a motor vehicle. The invention likewise relates to a wiping system comprising said actuating device as well as, for example, said driving arm 2 and/or said wiper blade 3.

The wiper blade 3, when it is mounted on the vehicle, rests against an external surface of the rear window of the vehicle. The rear window mentioned here is an example of a window that is wiped by the wiping system according to the invention, although it goes without saying that this window may be a windscreen of the vehicle and, in general terms, any of the glazing of a motor vehicle, the surface of which is capable of being wiped by a wiping system.

Said system is intended advantageously to be positioned on the vehicle in such a way that said wiper blade 3, when at rest, is in a substantially horizontal position, for example along a lower edge of the rear window. In operation, it then pivots with a back-and-forth motion between its resting position and a position in which it is displaced angularly from said resting position in such a way as to wipe the desired zone.

As can be appreciated more particularly in FIG. 2, the one or more wiper blades 3 are of the type having a flat blade, for example, that is to say comprising at least one scraper blade 4 intended to be pressed against the rear window and one or a plurality of stiffening spines 6, in this case being two in number, connected to the scraper blade 4 and extending along the length thereof. On the one hand, in this particular case on the left in FIG. 2, the scraper blade 4 and the spines 6 exhibit axial extremities situated facing one another, whereas, at their opposite extremities, the spines 6 extend axially beyond the scraper blade 4.

Said wiping system also comprises here an assembly socket 8 permitting the attachment of the scraper blade 4 and the spines 6 in the area of their extremities situated facing one another, as well as, in this case, a cover 64 for the spines 6 and for an upper part of the scraper blade 4 (FIGS. 1 and 3). At their other extremity, the spines 6, in particular their section protruding axially from the scraper blade 4, are attached to the driving arm 2, as described in more detail below.

The wiper blade 3 is set in motion on the rear screen of the vehicle by the actuating device 1, which is itself driven by an actuating assembly comprising, for example, an electric motor, advantageously electronic, that is responsible for transforming electrical energy into a rotating motion.

According to the invention, said actuating device 1 comprises a body 10 that is capable of receiving said arm 2. Said body 10 is hinged to rotate about a pivot axis in the direction indicated by an arrow 12 (FIG. 1). Said actuating device additionally comprises a means 14 for locking said arm 2 on said body 10, said locking means 14 being hinged on said body 10. In this way, a solution is available which permits the easy replacement of the blade 3 in the event of wear.

This is illustrated more particularly in FIGS. 4 and 5, in which said locking means 14 is respectively in an open position and in a locked position. In FIG. 4, it can be noted that the arm 2 is detached from the body 10 by the actuating device and may then be exchanged. In FIG. 5, it has been fitted back into place and it is blocked by the locking means 14.

With further reference to FIGS. 1 to 3, it will be noted that said body 10 comprises, for example, a housing passage 15 for a driving shaft 16 of the driving assembly intended to be attached to said body 10, said driving shaft causing said actuating device 1, and as a result said arm 2 and said blade 3, to pivot about said pivoting axis of the body. Said housing comprises a base 18, in the area of which a passage orifice 20 for said drive shaft 16 and a lateral wall 22 originating from the base 18 discharges in such a way that said housing defines a shoulder around said passage orifice 18.

Said locking means 14 is hinged to rotate on said body according to an axis of articulation 24 that is transversal to said pivot axis of the body 10. Said axis of articulation 24 in this case is oriented orthogonally to said pivot axis of the body 10, for example tangentially to a circle centered on said pivot axis.

Said locking means comprises, for example, a bar 26, said locking means 14 being configured to be capable of sandwiching said arm 2 between a flat spot 28 on said body 10 and said bar 26. Said locking means 14 in this case comprises two arms 30a, 30b connecting said bar 26 to said axis of articulation 24. Said bar 26 is thus hinged to rotate about said axis of articulation 24.

Said locking means 14 is articulated, for example, in the area of a distal extremity 32 of said body 10. Said arms 30a, 30b are equipped for this purpose, for example, with tabs 37 that are inserted elastically into articulation orifices 38 situated on lateral surfaces 39, in particular parallel, of the body 10.

Said locking means 14 may be configured in order to clip onto said body 10 at an opposite extremity 34 to said distal extremity 32, in particular by means of a hook 36. Said body 10 is equipped with a slot 33 for the insertion of said hook 36 in a locked position, said slot 33 being situated in this case in the area of the lateral wall 22 of the housing 15 of the body 10.

Said locking means 14 may comprise a passage 35 of a circuit for the supply of washing liquid, as described in detail below. In other words, the arms 30a, 30b extend in parallel from said axis of articulation 24 beyond said bar 26 and come together again in the area of the hook 36 in order to define said passage 36 between said bar 26 and said hook 36. Sais locking means 14 is configured in such a way that said passage is opposite said housing 15 of the body 10, in the locked position of said locking means 14.

As can be appreciated more particularly FIG. 4, said body 10 is advantageously configured in order to position said arm 2 before locking. In this case, the two lateral surfaces 39 provided with the articulation orifices 38 extend from said flat spots 28, said lateral wings 39 being configured to receive lateral wings 40 of said arm 2 and to permit blocking of said 2 arm in the tangential direction. Said lateral surfaces 39 comprise, for example, notches 42 configured to accommodate said wings 40 of the arm 2 by blocking them in a radial direction, corresponding to the axis of longitudinal extension of the blade 3. Said lateral surfaces 39 extend, for example, between the distal extremity 32 of the body 10 and the lateral wall 22 of the housing 15 of the body 10.

This being the case, and with further reference to FIGS. 1 to 3, it will be noted that said wiping system in accordance with the invention may likewise comprise a cover 46 of said wiping system. In use, said cover 46 covers, for example, said actuating device 1 and/or said arm 2. It is removable in order to permit access to said actuating device 1 and to pass from the locked position to the open position of the locking means 14.

Said body 10 may comprise one or a plurality of orifices 44 for the attachment of said cover 46 of said wiping system. Said attachment orifices 44 are situated, for example, between the bar 26 and the distal extremity 32 of the body 10, in a locked position. Said arm 2 may then comprise passage orifices 48 as an extension of said attachment orifices 44. The attachment of the cover 46 to the body 10 is thus realized by the introduction of tabs, not visible here, situated in the interior of said cover 46, into said attachment orifices 44 via the passage orifices 48.

Said arm 2 advantageously exhibits a spring effect permitting the blade 3 to be applied against the window to be wiped. It is manufactured for this purpose, for example, from a metallic material exhibiting an appropriate elasticity.

It further exhibits a profile in the form of a flattened S provided with two parallel tongues 50, 52 connected by an oblique branch 54.

One 50 of the tongues forms the proximal extremity of the arm 2. It is connected to said actuating device 1, in a locked position, by being sandwiched between said flat spot 28 of the body 10 and said bar 26 of the locking means 14. Said first tongue 50 is provided with said wings 40 of the arm 2 and with said orifices 48 for the passage of the tabs of the cover 46. Said first tongue in this case includes a pin 56 intended to cooperate with a groove 58 provided in the body 10 in the direction of said housing 15 of the body 10.

The other 52 of the tongues permits the attachment of the blade 3. For this purpose, it comprises in this case folded-down edges 60 in which the spines 6 are blocked.

Said wiping system may comprise in addition a device for spraying a screen washing liquid, in particular a spraying device from said blade 3.

As can be appreciated more particularly in FIG. 6, said spraying device comprises a spray boom 60 extending along the wiper blade 3, in the longitudinal direction of extension of the latter, said boom 60 including a plurality of spray orifices arranged in order to spray the washing liquid at least perpendicularly to the longitudinal direction in which it extends, as indicated by the arrows 62.

According to one illustrative embodiment, said spray boom 60 is manufactured separately from the scraper blade 4 and is attached to the latter. In particular, this may be a boom 60 formed in the cover 64 for the blade 3. According to another illustrative embodiment, said spray boom may be formed by a tube that is integrated with the scraper blade 4, which tube proceeds in the longitudinal direction of the latter.

Said spraying device may be configured in order to spray said window from said blade 3 in a first and/or a second opposing direction of spraying. In other words, a said spray boom may be situated to either side of said blade 3 in order to spray the window via a first and/or a second of said sides, in particular in the ascending or descending direction of the blade 3.

With further reference to FIGS. 4 and 5, it will be noted that said spraying device further comprises in this case a circuit for the supply of the one or more spray booms. Said supply circuit comprises, for example, a flexible tube 70 connecting a hydraulic connector 72 provided in the area of said arm and/or said blade 3, on the one hand, and, on the other hand, an inlet 74 for spraying liquid situated in the area of said pivot axis of the body 10. Said hydraulic connector 72 is situated, for example, in the area of a clip 76 joining said cover 64 to the rest of the wiper blade 3. Said liquid inlet comprises, in particular, a feed head 78 connected to a feed channel provided in the driving shaft 16. Said feed head 78 is situated in the area of said housing 15 for the body 10 and discharges via the passage 35 of said locking means 14, in the locked position.

In order to pass from said locked position to said open position, said flexible tube 70 is withdrawn from said hydraulic connector 72 and/or from said feed head 78. It may then be put back in place, after passing from the locking means 14 into the locked position.

Said spraying device is supplied via a device for the transport of the liquid for washing the windscreen, although not illustrated here. According to one illustrative embodiment, such a device for the transport of the liquid takes the form of one or a plurality of pipes which convey the washing liquid from at least one reservoir installed, for example, in a front compartment of the vehicle as far as the tube situated in the driving arm 16. The washing liquid is caused to circulate inside the device for the transport of liquid, in particular, by means of at least one pump.

The device for the transport of liquid, the pump and optionally the reservoir form an assembly for the supply of washing liquid.

The wiping and washing system may also comprise a heating device for the washing liquid. The latter is incorporated, for example, in the reservoir. Alternatively, it may be placed in any location in the device for the transport of liquid, for example in such a way as to surround a portion of one of the tubes forming this transport device.

In a manner known per se, the spraying of the washing liquid may be activated by means of a control on the steering wheel of the vehicle, configured in order to be actuated by the driver in such a way as to enable him to wash his rear window as required.

The invention claimed is:

1. An actuation device for a driving arm of a wiper blade for a motor vehicle, said device comprising:
    a body comprising:
        a distal extremity located at a first lateral end of the body;
        an opposite extremity located at a second lateral end of the body; and
        a housing passage formed along a pivot axis, proximate the opposite extremity; and
    a locking means hinged on the body proximate the distal extremity and configured to attach to the body proximate the opposite extremity, such that the locking means rotates about an axis of articulation that is transverse to the pivot axis,
    wherein the housing passage is configured to receive a driving shaft,
    wherein the body and the locking means are configured to lock the driving arm to the body, and
    wherein the body further comprises one or more attachment orifices configured to align with one or more passage orifices of the driving arm.

2. The device as claimed in claim 1, wherein said body is configured to position said arm prior to locking.

3. The device as claimed in claim 1, wherein said body comprises a flat spot and said locking means comprises a bar, said locking means being configured to sandwich said arm between said flat spot and said bar.

4. The device as claimed in claim 3, wherein said locking means comprises two arms connecting said bar to an axis of articulation.

5. The device as claimed in claim 3, wherein said body comprises two lateral faces extending from said flat spot configured to receive lateral wings of said arm and to permit blocking of said arm in a tangential direction.

6. The device as claimed in claim 5, wherein said lateral faces comprise notches configured to accommodate said wings by blocking the wings in a radial direction.

7. The device as claimed in claim 1, wherein said locking means are articulated in an area of a distal extremity of said body and are configured to clip onto said body at an opposite extremity.

8. The device as claimed in claim 1, wherein said body comprises one or a plurality of attachment holes for a cover.

9. A wiping system comprising an actuation device as claimed in claim 1.

10. The wiping system as claimed in claim 9, further comprising a driving arm attached to said actuation device and/or a wiper blade capable of being actuated by said arm.

11. The system as claimed in claim 10, wherein said arm exhibits a spring effect permitting the application of the blade against a screen to be wiped.

12. The system as claimed in claim 9, wherein system comprises a device for spraying from said blade.

13. The system as claimed in claim 12, wherein said spraying device comprises a flexible tube connecting a nozzle provided in an area of said arm and/or of said blade and an inlet for spraying liquid, situated in an area of said pivot axis of the actuation device.

14. The system as claimed in claim 9, wherein said system comprises a cover for said actuation device.

15. The actuation device of claim 1, wherein the locking means further comprise a hook and the body further comprises a slot configured to receive the hook.

16. A wiper system comprising:
an actuation device, comprising:
  a body having housing passage formed therethrough along a pivot axis; and
  a locking means hinged on the body, about an axis of articulation perpendicular to the pivot axis;
a driving shaft disposed within the housing passage;
a driving arm comprising a tongue held between the body and the locking means; and
a wiper blade supported by the driving arm,
wherein the driving shaft is disposed transverse to the driving arm, and
wherein the tongue further comprises a pin, and the body further comprises a groove configured to receive pins.

17. The wiper system of claim 16, wherein the driving arm comprises a second tongue, wherein the tongues are connected by a slanted portion, and wherein the tongues are parallel to each other.

18. A wiper system comprising:
an actuation device, comprising:
  a body having housing passage formed therethrough along a pivot axis; and
  a locking means hinged on the body, about an axis of articulation perpendicular to the pivot axis;
a driving shaft disposed within the housing passage;
a driving arm comprising a tongue held between the body and the locking means; and
a wiper blade supported by the driving arm,
wherein the driving shaft is disposed transverse to the driving arm, and
wherein the tongue further comprises one or more wings and the body further comprises one or more notches configured to receive the one or more wings.

* * * * *